US012431673B2

(12) United States Patent
Krnetic et al.

(10) Patent No.: US 12,431,673 B2
(45) Date of Patent: Sep. 30, 2025

(54) HEADER WITH BACKING PLATE FOR MOUNTING THE HEADER TO A MOUNTING SURFACE

(71) Applicants: Tyco Electronics Canada ULC, Mississauga (CA); TE Connectivity Solutions GmbH, Steinach (CH)

(72) Inventors: Zoran Krnetic, Mississauga (CA); David James Rhein, Troy, MI (US); Thomas Robert DeWitte, Troy, MI (US); Lindsey Gatesman, Winston Salem, NC (US); Adam Price Tyler, Troy, MI (US); Praveen Kumar HM, Bangalore (IN)

(73) Assignees: Tyco Electronics Canada ULC (CA); TE Connectivity Solutions GmbH (CH)

( * ) Notice: Subject to any disclaimer, the term of this patent is extended or adjusted under 35 U.S.C. 154(b) by 648 days.

(21) Appl. No.: 17/696,188

(22) Filed: Mar. 16, 2022

(65) Prior Publication Data

US 2023/0299546 A1 Sep. 21, 2023

(51) Int. Cl.
*H01R 13/74* (2006.01)
*H01R 13/52* (2006.01)
(Continued)

(52) U.S. Cl.
CPC ....... *H01R 13/748* (2013.01); *H01R 13/5202* (2013.01); *H01R 13/621* (2013.01); *H01R 13/629* (2013.01); *H01R 13/6581* (2013.01); *H01R 13/52* (2013.01); *H01R 13/6215* (2013.01); *H01R 13/622* (2013.01); *H01R 13/627* (2013.01); *H01R 13/6271* (2013.01); *H01R 13/6272* (2013.01); *H01R 13/6273* (2013.01); *H01R 13/6596* (2013.01);
(Continued)

(58) Field of Classification Search
CPC ............. H01R 13/748; H01R 13/5202; H01R 13/621; H01R 13/629; H01R 13/6581; H01R 13/52; H01R 13/6215; H01R 13/622; H01R 13/627; H01R 13/6271; H01R 13/6272; H01R 13/6273; H01R 13/6596; H01R 13/74; H01R 13/741; H01R 13/745; H01R 13/746
See application file for complete search history.

(56) References Cited

U.S. PATENT DOCUMENTS 11,329,431 B2 * 5/2022 Pao .................... H01R 13/6315

FOREIGN PATENT DOCUMENTS

CN 111370941 A * 7/2020
CN 113363750 A * 9/2021
(Continued)

*Primary Examiner* — Justin M Kratt

(57) ABSTRACT

An electrical connector assembly comprises a header and a backing plate attachable thereto. The header includes a plug portion for connecting to a complementary mating connector, and a base having a plurality of mounting through holes for fixing the header to a mounting surface. The backing plate includes a plurality of mounting elements corresponding in location to the plurality of mounting holes of the header for fixing the backing plate to the header on an underside of the mounting surface, and a central opening corresponding in location to the plug portion of the header with the backing plate fixed to the header.

16 Claims, 10 Drawing Sheets

(51) Int. Cl.

| | |
|---|---|
| ***H01R 13/621*** | (2006.01) |
| ***H01R 13/629*** | (2006.01) |
| ***H01R 13/6581*** | (2011.01) |
| *H01R 13/622* | (2006.01) |
| *H01R 13/627* | (2006.01) |
| *H01R 13/6596* | (2011.01) |

(52) U.S. Cl.

CPC ............ *H01R 13/74* (2013.01); *H01R 13/741* (2013.01); *H01R 13/745* (2013.01); *H01R 13/746* (2013.01)

(56) References Cited

FOREIGN PATENT DOCUMENTS

| | | | | | |
|---|---|---|---|---|---|
| DE | 202020105230 | U1 | * | 10/2020 | |
| KR | 102139930 | B1 | * | 7/2020 | |
| WO | WO-2021058129 | A1 | * | 4/2021 | ......... H01R 13/5202 |

* cited by examiner

HEADER WITH BACKING PLATE FOR MOUNTING THE HEADER TO A MOUNTING SURFACE

FIELD OF THE INVENTION

The present disclosure relates to electrical connectors, and more particularly, to a backing plate for use with an electrical header.

BACKGROUND

Electronic components are often housed or packaged separately from a remainder of a larger electrical system in which they are utilized, promoting ease of integration and improved protection of sensitive components from harsh environmental conditions. As a result, the components must be electrically interconnected with other elements of the system. These connections are often implemented via wires or cables joining various components using complementary electrical connectors, including device-mounted headers.

Packaged or housed devices may include an interface or mounting surface on which a header is mounted. For devices operating in harsh environments, including those exposed to dirt and/or moisture, the header or connector may incorporate one or more seals for preventing the ingress of contaminants into the device. Likewise, mounting features of the device interface typically comprise blind threaded mounting holes for preventing contaminants from entering through the mounting features of the header (e.g., through fastener openings of the header and the interface). Some devices, however, implement interfaces with open through holes in place of blind mounting holes. The use of through holes necessitates additional sealing provisions for preventing the seepage of contaminants into the device. Moreover, the use of through holes creates additional challenges from a fastening perspective, as at least one half of a fastening assembly (e.g., a nut or a bolt) must be placed within an interior of the device.

Accordingly, there is a need for electrical header assemblies specifically suited for use with interfaces implementing mounting through holes.

SUMMARY

In one embodiment of the present disclosure, an electrical connector assembly comprises a header and a backing plate attachable thereto. The header includes a plug portion for connecting to a complementary mating connector, and a base having a plurality of mounting through holes for fixing the header to a mounting surface. The backing plate includes a plurality of mounting elements corresponding in location to the plurality of mounting holes of the header for fixing the backing plate to the header on an underside of the mounting surface, and a central opening corresponding in location to the plug portion of the header with the backing plate fixed to the header.

BRIEF DESCRIPTION OF THE DRAWINGS

The invention will now be described by way of example with reference to the accompanying Figures, of which.

DETAILED DESCRIPTION OF THE EMBODIMENTS

Figure 1:
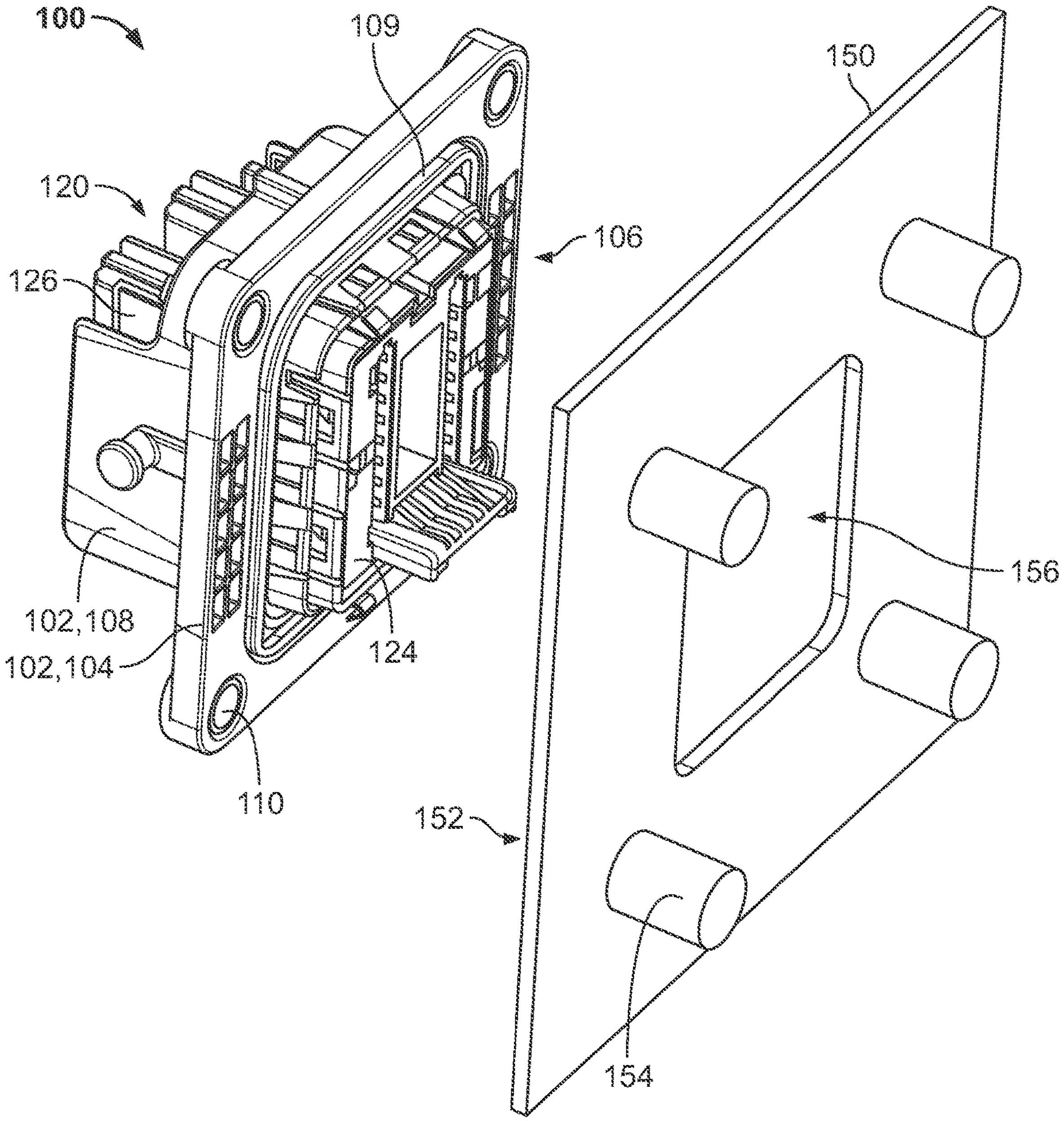
FIG. 1 is a perspective view of a header according to an embodiment of the present disclosure, and an interface or mounting surface according to the prior art.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include an electrical header or connector assembly mountable to an object, such as to a housing of an electronics component or device. The assembly comprises a header and a corresponding backing plate fixable therewith for attaching the header to the device. The header includes a body defining a plug on a first side thereof configured to mate with a corresponding mating connector. A second end of the plug is adapted to mate with of the device or component, such as with a bus bar arranged within its housing. A base of the header includes a plurality of mounting features, such as through holes for receiving respective fasteners. The backing plate of the assembly defines a corresponding plurality of mounting features or elements, such as blind threaded apertures corresponding in location to the mounting features of the header. In use, the backing plate is arranged on an underside of a mounting surface or interface of the device (e.g., a housing sidewall), and the header positioned thereover. A plurality of fasteners (e.g., bolts) are used to secure the header to the backing plate through the interface.

Referring generally to FIG. 1, a header 100 according to an embodiment of the present disclosure and a device interface or mounting surface 150 (e.g., an interface plate) according to the prior art is shown. The header 100 includes a body 102 having a flange-like base 104 defining a central opening 106. A circumferential wall 108 of the body 102 extends from the base 104 for engaging with a corresponding mating connector (not shown). A plug assembly 120 is received within the opening 106 and includes a plurality of conductors 122 (see FIG. 2) arranged within an insulating body 124. A metallic shield 126 (e.g., a sheet metal shield) may be arranged between the body 102 and the insulating body 124, and generally surrounds the plug assembly 120 within the opening 106. The base 104 includes a plurality of mounting features or elements 110, such as a plurality of through holes arranged radially about the opening 106. A header seal 109 is provided on a bottom surface of the header 100 (e.g., received within a corresponding channel defined on the bottom surface), and generally surrounds the opening 106 for creating a seal between the header and the interface 150 about the opening.

The interface 150 according to the prior art comprises, for example, a housing wall of an electronics device. The interface 150 includes a central opening 156 for receiving a protruding end of the plug assembly 120 therethrough when the header 100 is fixed to the interface. The interface 150 defines a plurality of blind threaded mounting holes formed into a top or front side 152 thereof. The mounting holes are defined in bosses 154 extending from an underside of the interface 150. The blind nature of the mounting holes eliminates the need for further sealing provisions, as contaminants entering the mounting holes are not in fluid communication with an interior of the device associated with the interface 150.

Figure 2:
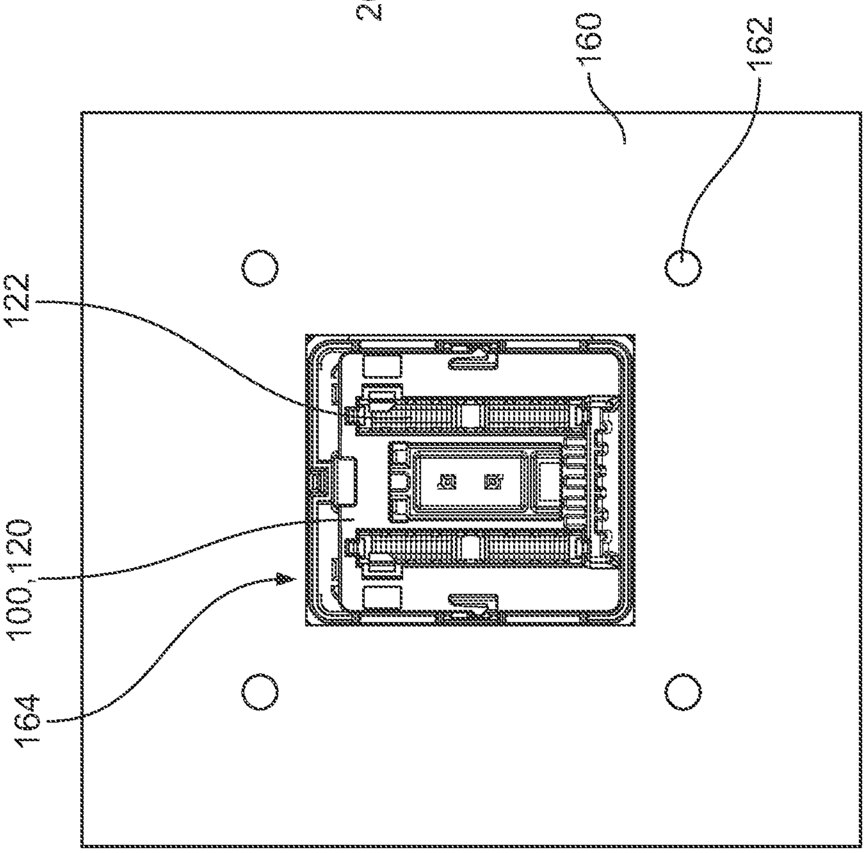
FIG. 2 is a bottom view of the header of FIG. 1, and a device interface according to an embodiment of the present disclosure.

As set forth above, however, electronics packages and other components are being implemented with through holes in place of the integrated mounting bosses 154 shown in FIG. 1. For example, as shown in FIG. 2, a device interface or mounting surface 160 (e.g., an interface plate) of another electronics device or other component includes a plurality of through holes 162 for mounting the header 100 thereto. The interface 160 includes a central opening 164 corresponding to (e.g., for receiving) the end of the plug assembly 120 of the header 100. Unlike the mounting bosses 154, however, the through holes 162 expose an interior of the device associated with the interface 160 to contaminants from the external environment. The use of conventional fasteners, such as threaded nuts on the underside of the interface, is insufficient to prevent the ingress of contaminants, and particularly fluids, into the device.

Referring now to FIGS. 3-7, in order to remedy this shortcoming, embodiments of the present disclosure include a backing plate 200 adapted to mount to, or be positioned adjacent, the underside of the header interface or mounting surface 160. The backing plate 200 includes a frame 202 defining a plurality of receptacles 204 positioned in locations corresponding to (i.e., coaxial with) the mounting features 110 of the header 100 and the through holes 162 of the interface 160. The frame 202 is generally rectangular (e.g., square) in shape, and includes a plurality of equal-length frame arms 203 each connected between a pair of the receptacles 204. The frame 202 defines a central opening 216 corresponding in location to the plug portion 120 of the header 110.

Figure 3:
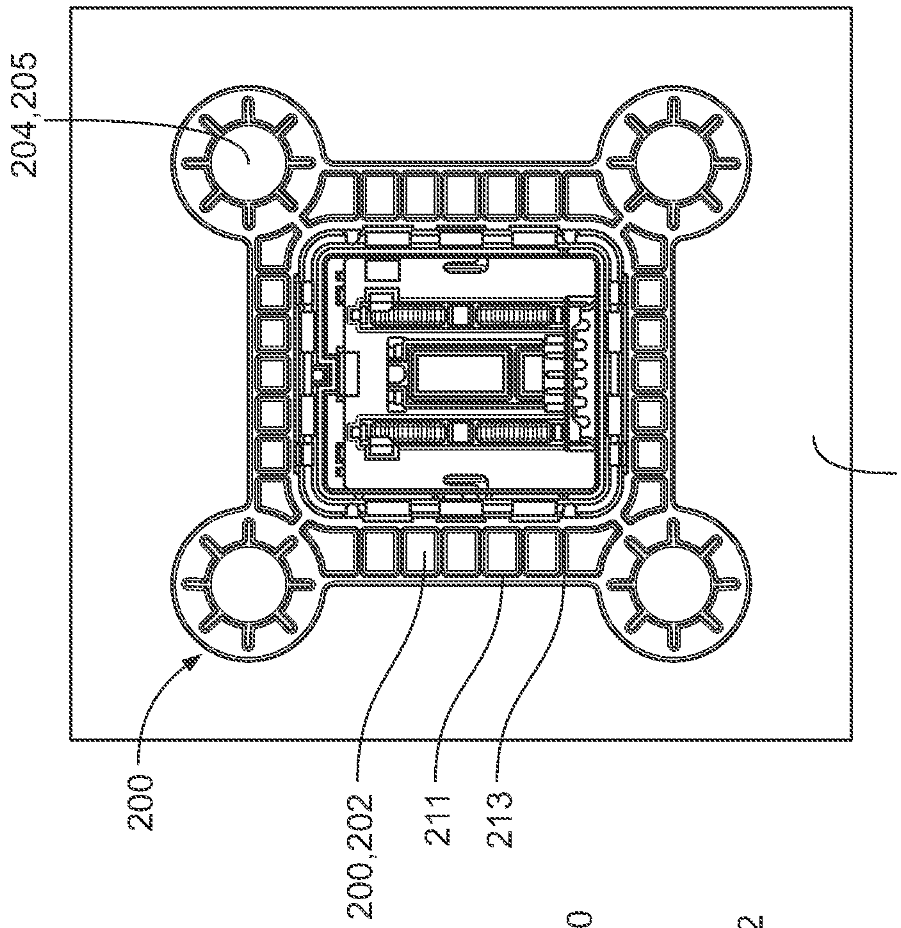
FIG. 3 is a bottom view of a header assembly including a backing plate according to an embodiment of the present disclosure.
Figure 4:
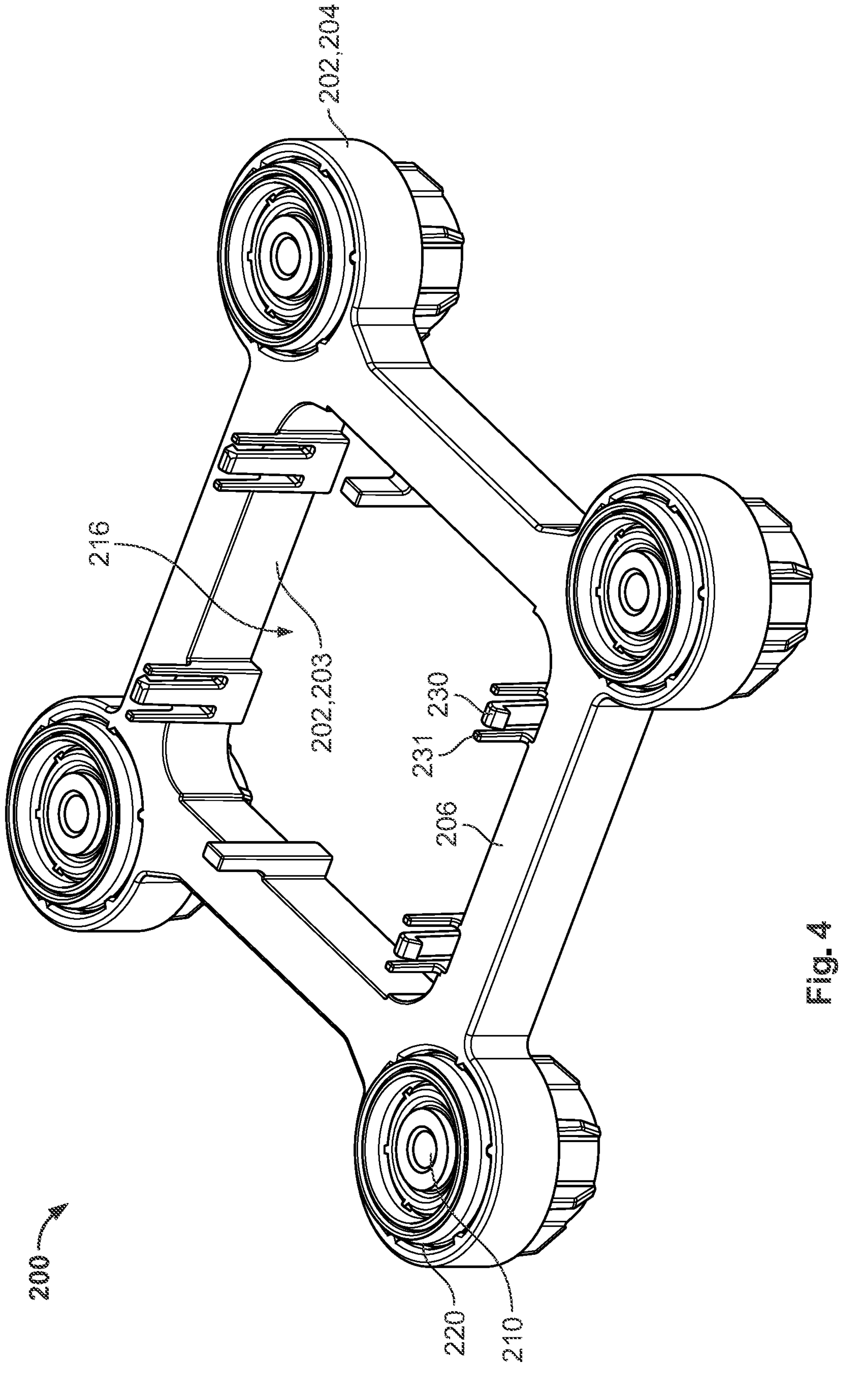
FIG. 4 is a perspective view of the backing plate shown in FIG. 3.
Figure 5:
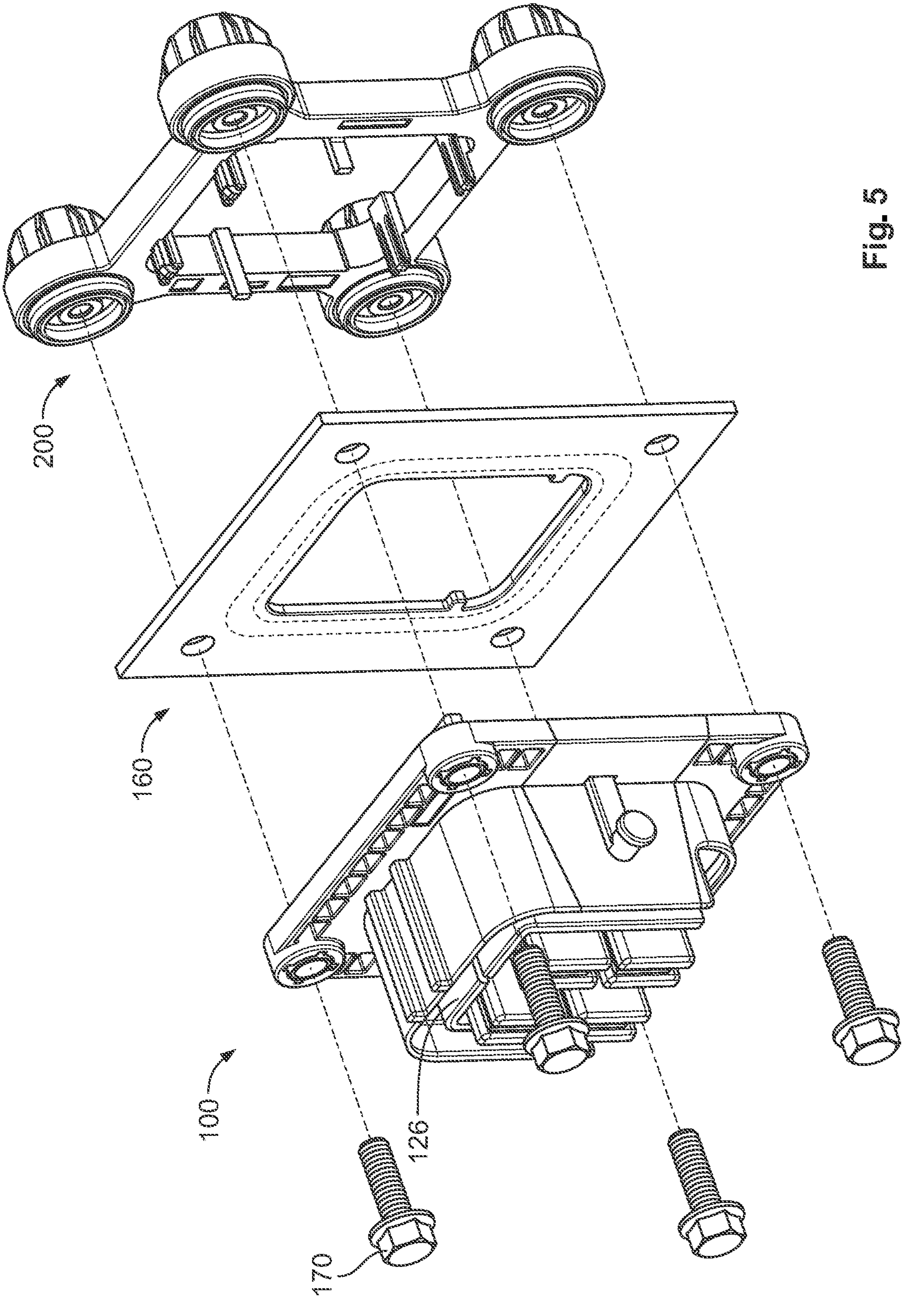
FIG. 5 is an exploded view of a header assembly according to an embodiment of the present disclosure.

As shown in FIGS. 3 and 4, each frame arm 203 may comprise a U-shaped cross-section including outer and inner sidewalls 211 extending in an axial direction of the arm. A plurality of stiffening ribs 213 may be formed between the sidewalls 211 in a direction transverse to the axial direction. In this way, the frame 202 may be made as light as possible, while maintaining adequate strength and stiffness. The stiffening ribs 213 may also be provided radially about a center of each receptacle 204. Each of the inner and outer sidewalls 211 extend from an underside of a generally planar mounting surface 206 of the frame 202. The mounting surface 206 is adapted to abut, or at least oppose, the underside of the interface 160 with the backing plate 200 in a mounted or installed position.

Referring again to FIGS. 3-7, the receptacles 204 at least partially define mounting elements in the form of blind, threaded holes formed integrally with the frame 202. Each hole or mounting element is configured to receive a threaded fastener 170 (e.g., a bolt) inserted through the header 100 and the interface 160. In one embodiment, the threads may be formed directly in holes formed in each receptacle 204. In the exemplary illustrated embodiment, however, the receptacles 204 define openings 207 adapted to receive a threaded insert 210 (e.g., a threaded metallic insert). In this way, the frame 202 may be formed from, for example, a light-weight, monolithic polymer material (e.g., plastic), while the threaded connections can be reinforced via the more durable inserts 210. The inserts 210 may be threaded into the openings 207, or may be press-fit therein, ensuring they remain stationary when installing the fasteners 170. In either embodiment, a closed rear side 205 of each receptacle 204 faces an interior of the device or component associated with the interface 160. The rear sides 205 close the openings 207, thereby creating blind openings.

Figure 7:
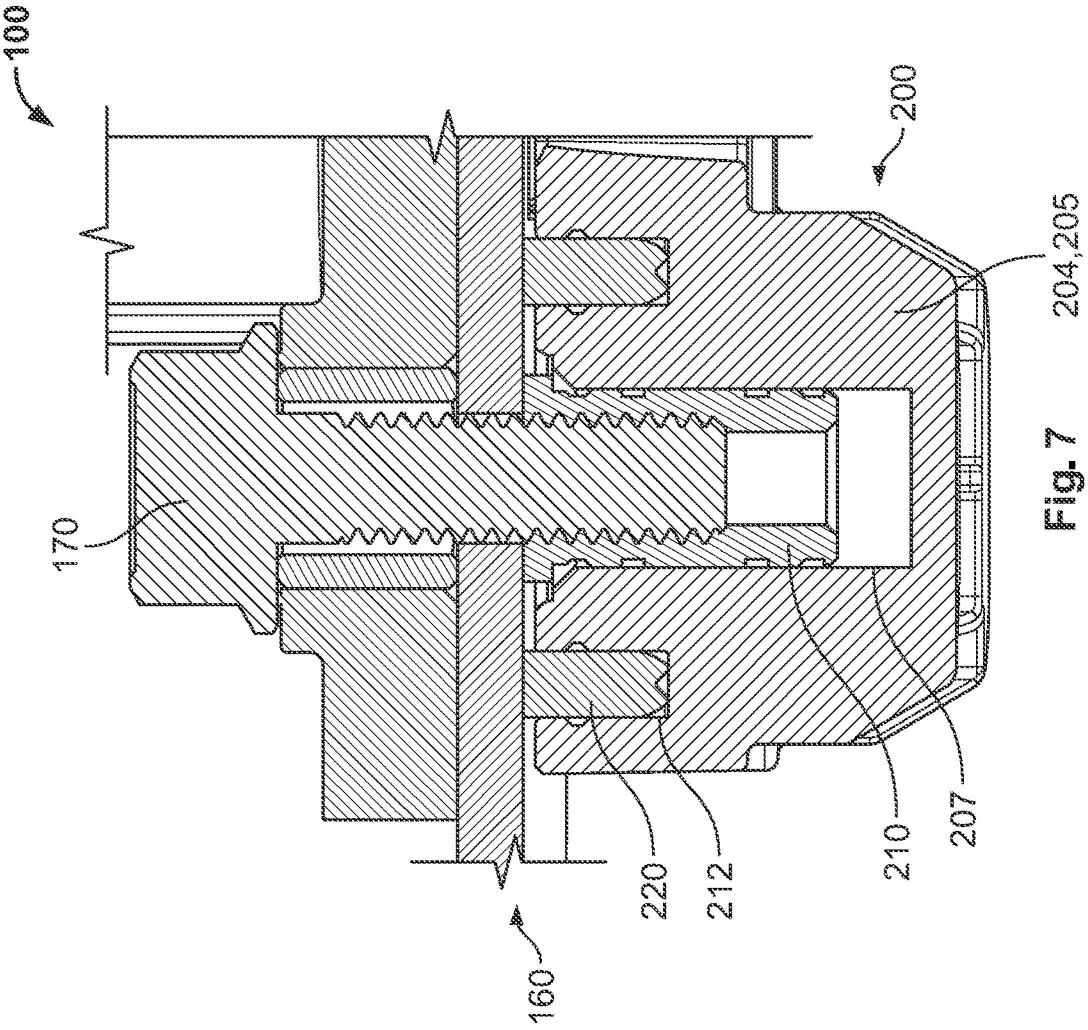
FIG. 7 is a partial cross-sectional view of the header assembly of FIG. 6.
Figure 6:
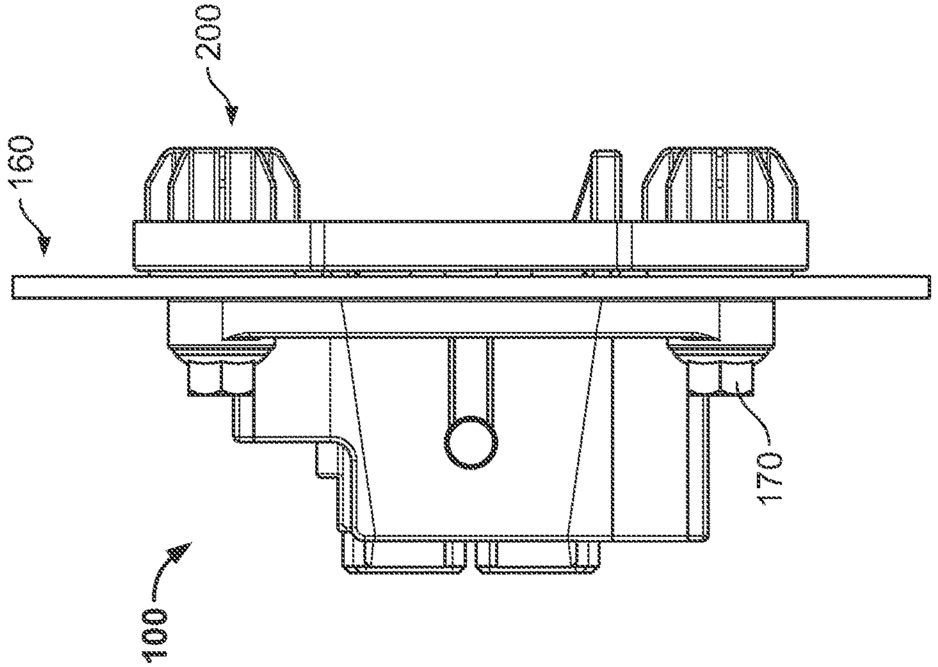
FIG. 6 is a side view of the header assembly of FIG. 5.

With particular reference to FIGS. 4 and 7, the frame 202, or each receptacle 204 thereof, defines an annular sealing seat or channel 212 formed therein and generally surrounding each opening 207. A seal 220 (e.g., a rubber O-ring seal) is received and held within each seat 212. A sealing face of each seal 220 extends above the mounting surface 206 of the frame 202 for engaging with an underside of the interface 160, thus sealing each threaded opening and/or fastener from the interior of the device associated with the interface. As shown in FIG. 7, each seal 220 may comprise ribbed sealing surfaces or faces opposing a bottom of each seat 212 and the underside of the interface 160. Each seal 220 prevents contaminants introduced into the receptacle 204 via the openings 110, 162 formed in the header 100 and the device interface 160 from entering an interior of the device or components associated with the interface. In this way, the seal 220 isolates the openings or holes 110, 162, 207 from the central opening 216 of the backing plate 200.

Figure 8:
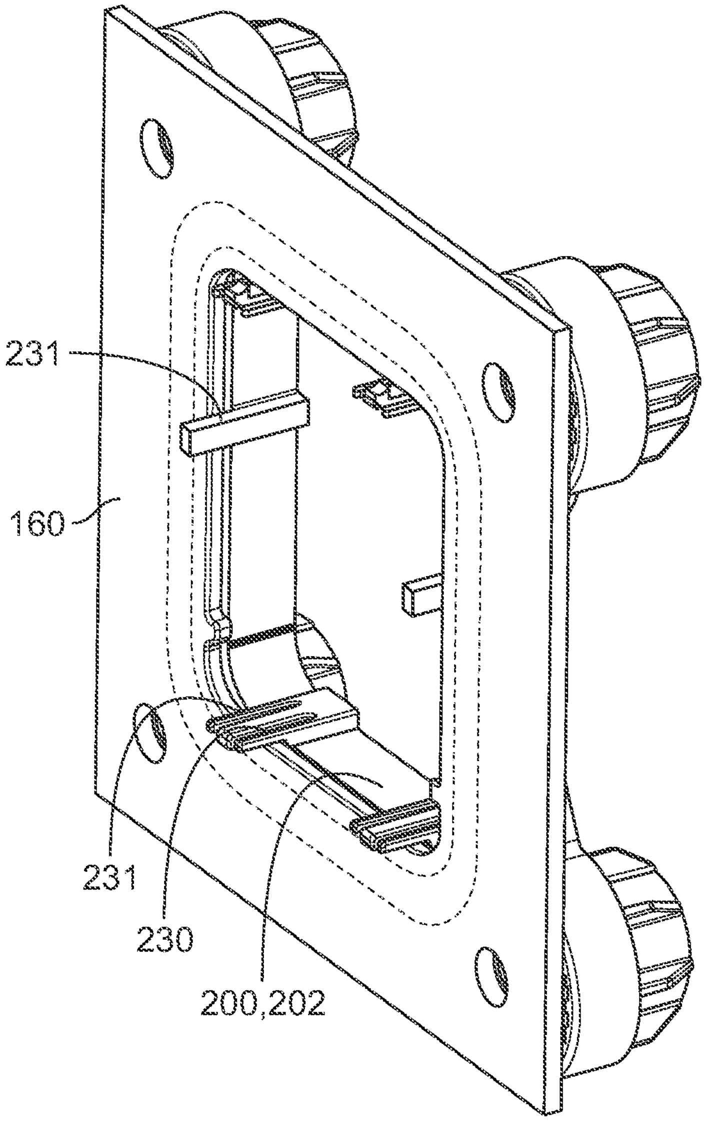
FIG. 8 is a perspective view of an interface and backing plate according to an embodiment of the present disclosure.
Figure 9:
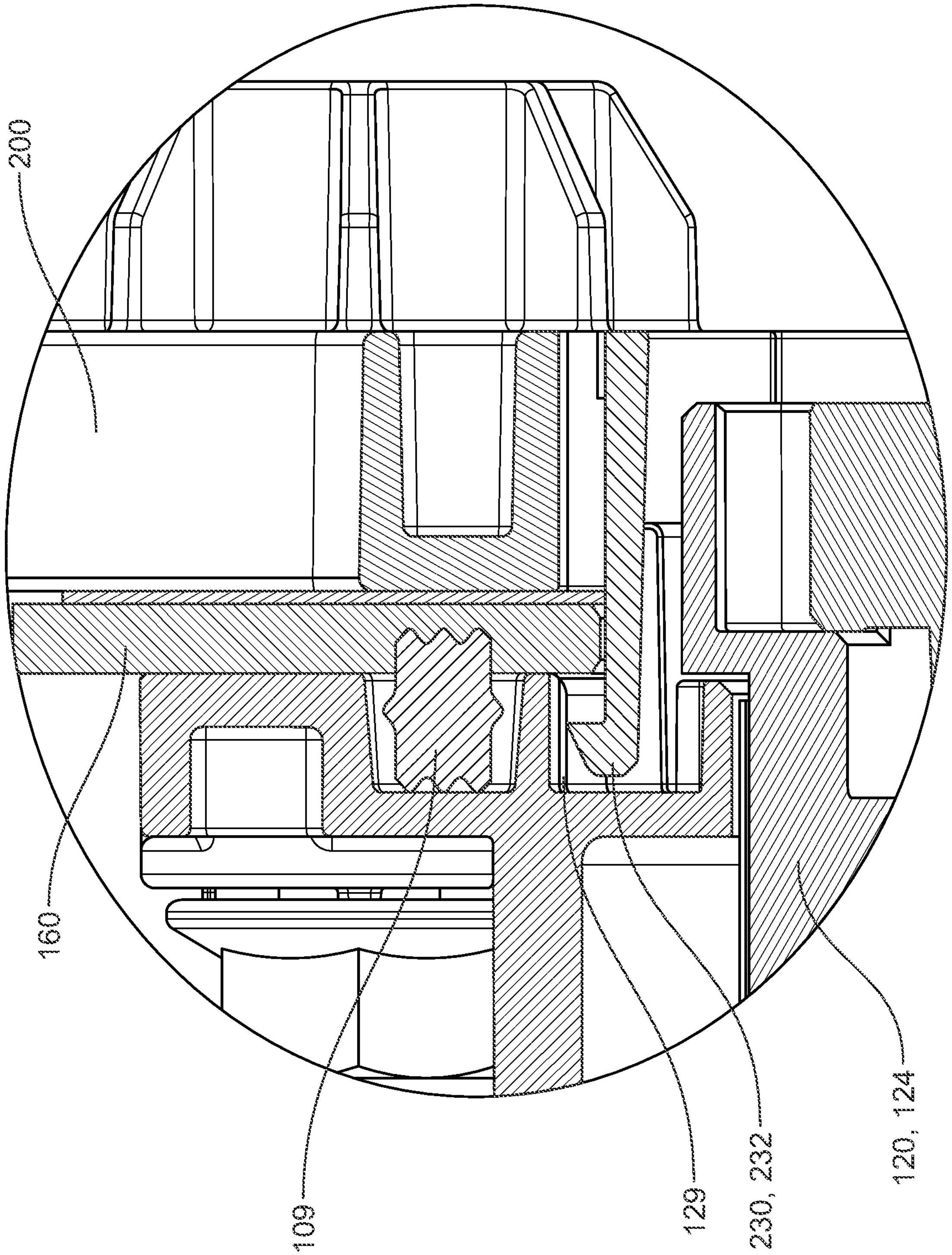
FIG. 9 is a partial cross-sectional view of a header assembly according to an embodiment of the present disclosure.

Referring now to FIGS. 8-11, embodiments of the present disclosure further include provisions for pre-locking the backing plate 200 to one of the header 100 or the device interface 160 independent of the primary mounting features (i.e., the fasteners 170 and threaded receptacles 204). Specifically, referring generally to FIGS. 8 and 9, in one embodiment, pre-locking features or elements include a plurality of elastic latches 230 arranged about and extending generally from the opening 216 of the frame 202. Each latch 230 includes a first end fixedly attached to the backing plate 200 (e.g., molded with the frame 202). A free end 232 of each latch 230 defines a latching protrusion adapted to engage with one of the header 100, or in the illustrated embodiment, an outer surface of the interface 160 through the opening 164. In this way, the backing plate 200 may be pre-attached, or pre-locked, to the inside of the device or device interface 160, prior to the installation of the header 100. Subsequently, the header 100 may be fitted to the interface 160 and fastened via the fasteners 170 without the need to independently hold the backing plate in place. As shown in FIG. 9, the underside of the header 100 may include at least one recess 129 corresponding in location to each latch 230 for ensuring the latch does not prevent the header from abutting the interface 160 in a flush manner.

As shown in FIGS. 4 and 8, in one embodiment, positioning protrusions 231 may be formed on either side of each elastic latch 230 for supporting the backing plate 200 in the installed position within the opening 164 of the interface 160. More specifically, each positioning protrusion 231 is adapted to oppose or abut an inward facing internal surface defining the opening 164. In this way, the protrusions 231 are adapted to position the backing plate 200 with respect to the opening 164, and thus reduces mechanical stress placed on the latches 230.

Figure 10:
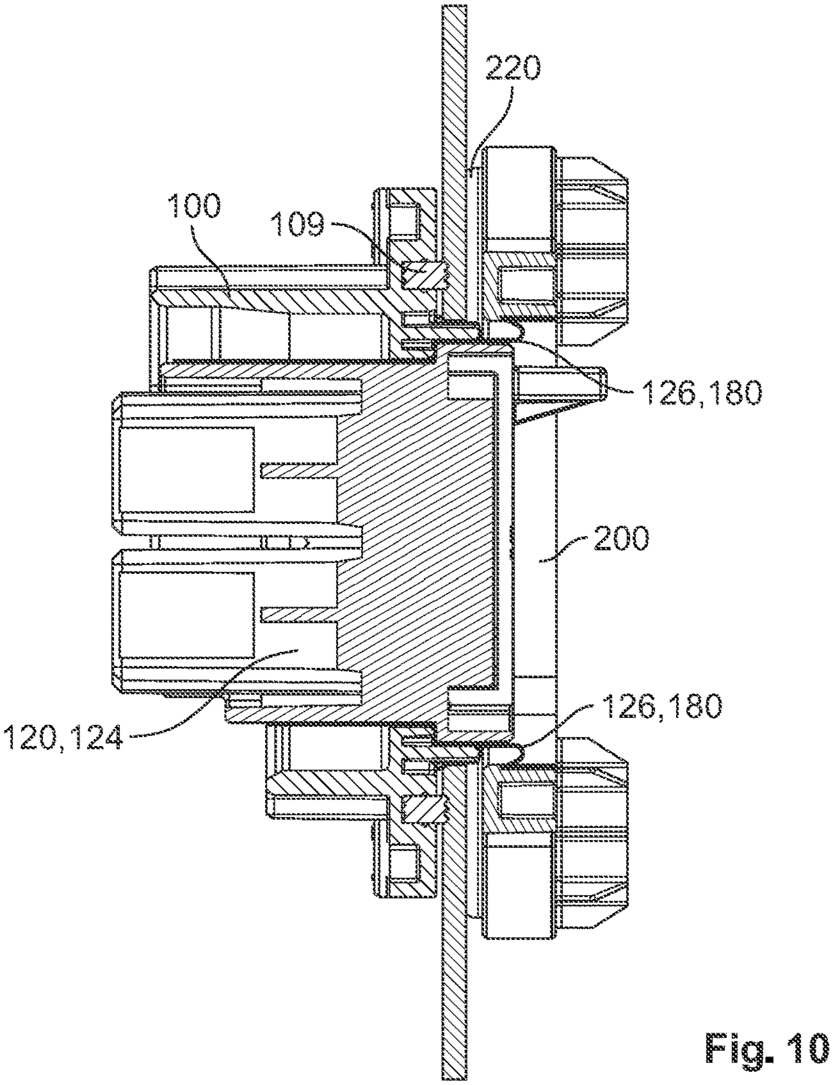
FIG. 10 is a cross-sectional view of a header assembly according to an embodiment of the present disclosure.
Figure 11:
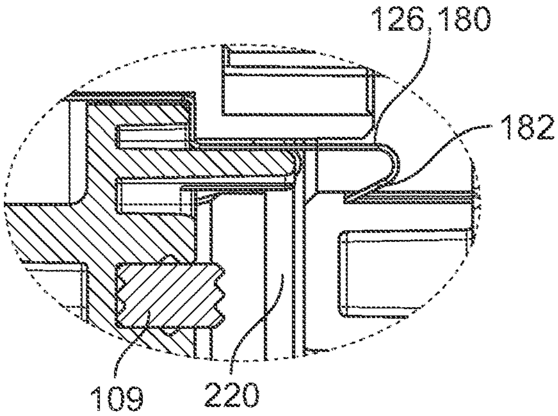
FIG. 11 is a partial cross-sectional view of the header assembly according of FIG. 10.

Referring now to FIGS. 10 and 11, according to another embodiment, the pre-locking elements may be embodied as a part of the header 100. Specifically, the header 100 defines a plurality of elastic latches or hooks 180 extending from an underside thereof. A free end 182 of each latch 180 is adapted to engage with the backing plate 200 (e.g., with a corresponding catch formed thereon) for pre-locking the header 100 to the backing plate prior to the installation of the fasteners 170. In the illustrated embodiment, the latches 180 are formed integrally with the metallic shield 126 surrounding the plug assembly 120.

Figure 13:
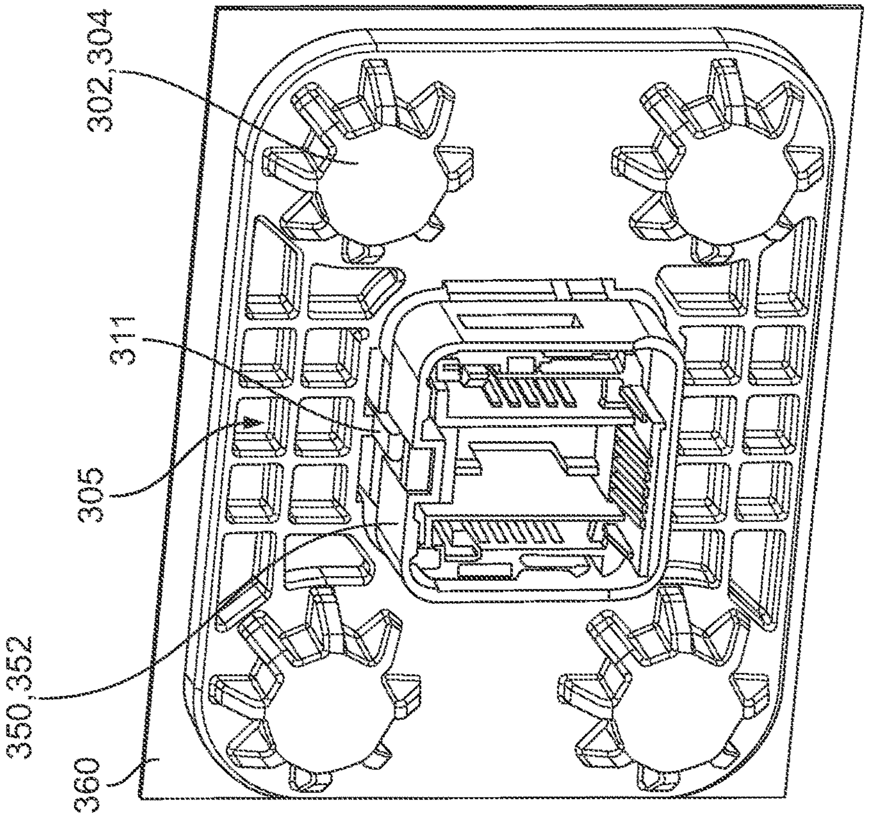
FIG. 13 is a bottom perspective view of a header assembly according to an embodiment of the present disclosure.
Figure 12:
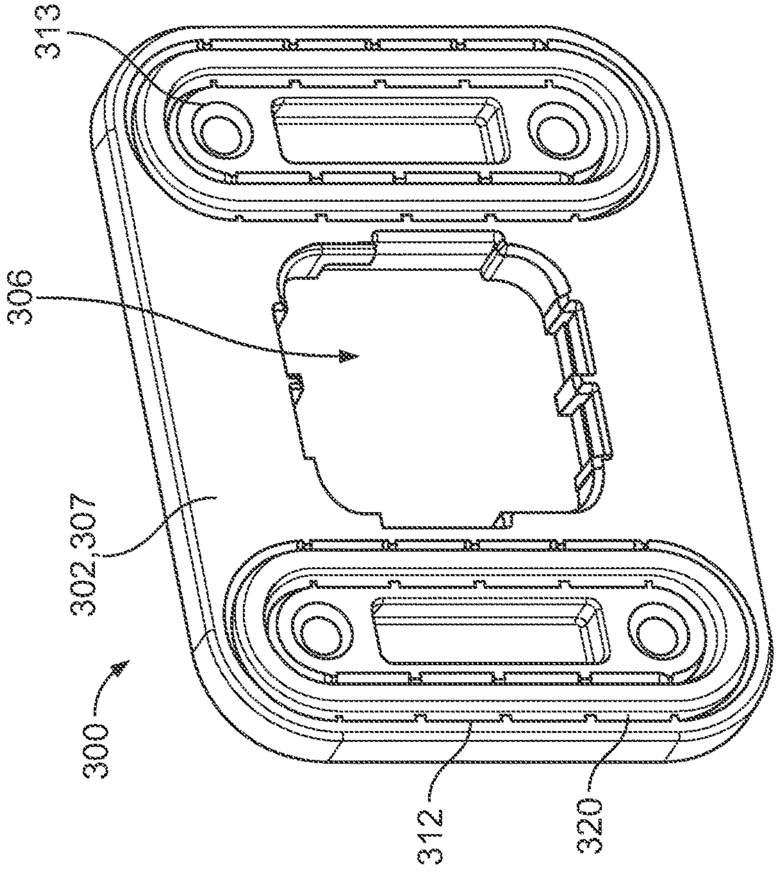
FIG. 12 is a top perspective view of a backing plate according to another embodiment of the present disclosure.

According to another embodiment, as shown in FIGS. 12 and 13, a backing plate 300 may include a plate-like frame 302 having a size and shape at least corresponding to the base of an associated header 350. In one embodiment, a mating face 307 of the frame 302 comprises a surface area that is greater than that of an opposing surface of the base of the header 350. The larger surface area of the frame 302 is beneficial for use with, for example, a sheet-metal device interface 360, wherein the added rigidity of the plate-like frame is desired.

The frame 302 defines a plurality of receptacles 304 for receiving, for example, threaded inserts 313 as set forth above. A central opening 306 of the frame 302 comprises a complementary profile to that of a second end of a plug assembly 352 of the header 350. In one embodiment, the frame 302 defines a latch 311 for engaging with and securing the header 350, as shown in FIG. 13. The frame 302 may further include a plurality, or grid, of recesses or pockets 305 for reducing the weight of the frame, while maintaining rigidity. As shown in FIG. 12, the backing plate 300 defines two sealing seats 312 for receiving accompanying seals 320. Each seat 312 and seal 320 surrounds a plurality (i.e., two) of the threaded inserts 313 of the receptacles 304, reducing the number of components of the assembly and simplifying manufacturing.

Figure 14:
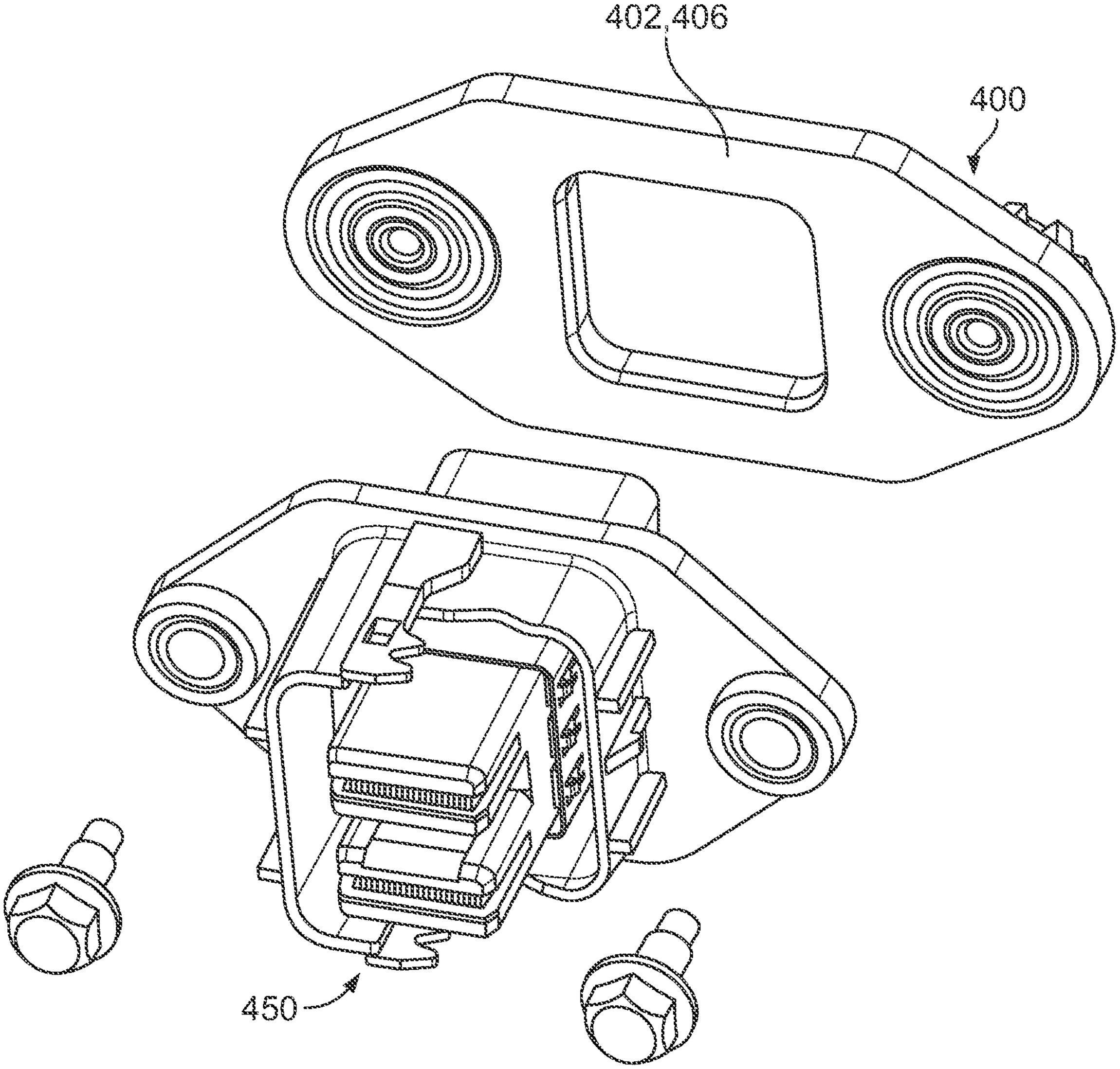
FIG. 14 is an exploded view of a header assembly according to another embodiment of the present disclosure.

FIG. 14 shows another exemplary embodiment of a header assembly wherein a backing plate 400 includes another plate-like frame 402 and associated threaded inserts and sealing elements. The frame 402 may correspond in size and/or shape to a base of an associated header 450. In the exemplary embodiment, however, a surface area of a mating face 406 of the frame 402 is greater than the opposing surface area of the header 450. As with the embodiment of FIGS. 12 and 13, the increased surface area of the mating face 406 is suited for use in applications in which stiffening the interface may be desired (e.g., with sheet metal or other flexible interfacing surfaces).

The above-embodiments have been described as implementing fasteners (e.g., bolts) inserted through the header from the external environment for threadably securing to backing plates. However, according to other embodiments of the present disclosure, a backing plate may implement fixed threaded studs in place of the threaded inserts. The studs extend from the backing plate and are received through the interface holes and the mounting holes of the header. Once received, a threaded nut may be fastened thereto for fixing the header to the interface and the backing plate.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles “a” and “an” preceding an element or component of the invention are intended to be nonrestrictive regarding the number of instances, that is, occurrences of the element or component. Therefore “a” or “an” should be read to include one or at least one, and the singular word form of the element or component also includes the plural unless the number is obviously meant to be singular.

The term “invention” or “present invention” as used herein is a non-limiting term and is not intended to refer to any single embodiment of the particular invention but encompasses all possible embodiments as described in the application.

What is claimed is:

1. An electrical connector assembly, comprising:

a header arranged on a first side of a mounting part, the header including:

a plug portion for connecting to a complementary mating connector;

a first elastic latch; and a base having a plurality of mounting through holes for fixing the header to a mounting surface of the mounting part; and a backing plate including:

a plurality of mounting elements corresponding in location to the plurality of mounting holes of the header for fixing the backing plate to the header on an underside of the mounting part opposite the header, each mounting element comprising a threaded hole adapted to receive a corresponding plurality of fasteners inserted through the mounting through holes of the header;

an opening corresponding in location to the plug portion of the header with the backing plate fixed to the header; and a second elastic latch having a fixed end and a free end adapted to engage with the mounting surface for fixing the backing plate to the mounting part independent of the mounting elements of the backing plate, the first elastic latch of the header having a fixed end attached to the header and a free end extending from an underside of the header and latching to the backing plate, wherein the mounting part includes an opening aligned with the plug portion of the header, the free end of the first elastic latch extends from the header and through the opening of the mounting part, and engages the backing plate, and the free end of the second elastic latch extends from the backing plate and through the opening of the mounting part, and engages with the mounting surface.

2. The connector assembly of claim 1, wherein the mounting elements of the backing plate include a plurality of threaded inserts fixedly attached to the backing plate.

3. The connector assembly of claim 1, further comprising a plurality of sealing elements for engaging with the underside of the mounting part, each sealing element surrounding at least one of the mounting elements of the backing plate.

4. The connector assembly of claim 1, further comprising a header seal positioned on an underside of the header and surrounding the plug portion for creating a seal between the header and the mounting surface.

5. The connector assembly of claim 1, wherein the at least one second elastic latch includes a plurality of elastic latches formed integrally with the backing plate.

6. A backing plate for securing an electrical header to a device, comprising:

a frame defining a central opening for receiving a plug portion of the header;

a plurality of mounting elements arranged about the central opening for fastening the frame to the header;

a plurality of latches arranged about the central opening of the frame for fixing the backing plate to the device; and a plurality of guide protrusions arranged about the central opening and extending in the direction of the latches for engaging with an opening of the device for positioning the backing plate.

7. The backing plate of claim 6, wherein the mounting elements comprise blind threaded holes for receiving a corresponding plurality of fasteners inserted through the header.

8. The backing plate of claim 7, wherein the threaded holes are defined by a plurality of threaded inserts fixedly received within a corresponding plurality of receptacles defined by the frame.

9. The backing plate of claim 6, further comprising at least one sealing element for isolating the mounting elements from the central opening.

10. The backing plate of claim 9, further comprising a plurality of sealing elements, each sealing element surrounding at least one of the mounting elements and extending above a mating surface of the frame.

11. The backing plate of claim 10, wherein each sealing element surrounds a plurality of the mounting elements.

12. The backing plate of claim 6, wherein the frame comprises a monolithic polymer frame.

13. An electrical connector assembly, comprising:

a header including a plug portion for connecting to a complementary mating connector, and a base having a plurality of mounting through holes for fixing the header to a mounting surface;

a backing plate including a plurality of mounting elements corresponding in location to the plurality of mounting holes of the header for fixing the backing plate to the header on an underside of the mounting surface, and an opening corresponding in location to the plug portion of the header with the backing plate fixed to the header; and a locking element for fixing the backing plate to the header independent of the mounting elements of the backing plate, the locking element includes at least one elastic latch formed integrally with a metallic shield of the plug portion and having a fixed end attached to the header and a free end extending from an underside of the header for latching to the backing plate.

14. An electrical connector assembly, comprising:

a header including a plug portion for connecting to a complementary mating connector, and a base having a plurality of mounting through holes for fixing the header to a mounting surface discrete from the mating connector; and a backing plate including:

a plurality of mounting elements corresponding in location to the plurality of mounting holes of the header for fixing the backing plate to the header on an underside of the mounting surface;

an opening corresponding in location to the plug portion of the header with the backing plate fixed to the header; and a first elastic latch having a fixed end and a free end adapted to engage with the mounting surface for fixing the backing plate to the mounting surface independent of the mounting elements of the backing plate, the header further defining a recess formed into the underside thereof and receiving the free end of the first elastic latch.

15. The connector assembly of claim 14, wherein the header further includes a second elastic latch having a fixed end attached to the header and a free end extending from an underside of the header and latching to the backing plate.

16. The connector assembly of claim 15, further comprising a mounting element arranged between the header and the backing plate and defining the mounting surface, the mounting element including an opening aligned with the plug portion of the header, wherein:

the free end of the first elastic latch extends from the backing plate and through the opening of the mounting element, and engages with the mounting surface; and the free end of the second elastic latch extends from the header and through the opening of the mounting element, and engages the backing plate.

* * * * *